2,731,437

DIGLYCIDYL THIOETHERS OF DITHIOLS CONTAINING OXYGEN PREPARATION AND REACTION PRODUCTS

Howard L. Bender, Bloomfield, Alford G. Farnham, Caldwell, and John W. Guyer, Verona, N. J., assignors to Union Carbide and Carbon Corporation, a corporation of New York No Drawing. Application April 29, 1953,
Serial No. 352,024

16 Claims. (Cl. 260—42)

This invention relates to a new class of diepoxides which are diglycidyl thioethers of dithiols.

Such dithiols are generally made from polysulfide resins and rubbers which are first formed by the reaction of organic dihalides with an inorganic polysulfide. These polysulfide polymers are then reduced, as by hydrogenolysis, to cleave some of the disulfide linkages to form lower molecular weight liquid polymers or chemicals having terminal thiol groups. For forming one group of polysulfide resins or rubbers suitable for reduction to such liquid polymer, dichloroethyl formal is reacted with sodium polysulfide, although other organic halides may be substituted therefor, such as ethylene dichloride, propylene dichloride, dichlorethyl ether, and triethylene glycol dichloride.

Depending on the degree of reduction and on the molecular weight of the starting polysulfide resins, the liquid polymers may be of different average molecular weights varying, as in the case of the polymers from dichloroethyl formal, from about 168 to about 4000 and having corresponding viscosities from 0.5 to 450 poises.

In more detail, one such class of dithiols comprises the class of polymers having the structure:

HS($CH_2CH_2OCH_2OCH_2CH_2SS$)$_n$
$CH_2CH_2OCH_2OCH_2CH_2SH$ where $n$ is 0 or a whole number having a value from 1 to 50. When $n$ is a low number the polymers are liquids, and when $n$ is a high number the polymers are solids which may be melted or dissolved to form liquid compositions. These polymers, many of which are available commercially, have different properties depending on their average molecular weight as shown in the following table:

| Molecular weight | 300 | 1,000 | 4,000 |
|---|---|---|---|
| Viscosity poises | 0.5 | 10 | 450 |
| pH | 5 to 6 | 5 to 6 | 6 to 8 |
| Specific gravity (20/20) | 1.23 | 1.27 | 1.27 |

This class of polymers may also be termed aliphatic saturated oxahydrocarbon polythiopolymercaptans.

The new diepoxides of the invention are formed by reacting epichlorhydrin with the foregoing dithiols in the presence of an alkali. The reaction may proceed in two stages; the first stage being the reaction of epichlorhydrin with the dithiol to form a dichlorhydrin thioether of the dithiol and the second stage being the dehydrochlorination of this dichlorhydrin thioether to form the diepoxide which is the diglycidyl thioether of the starting dithiol. These reactions may be represented as follows:

I.
HS—R—SH + 2H$_2$C——CH—CH$_2$Cl
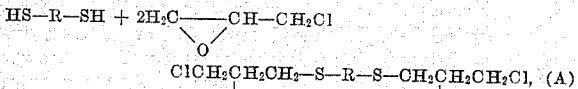
ClCH$_2$CH$_2$CH$_2$—S—R—S—CH$_2$CH$_2$CH$_2$Cl, (A)
                    |                     |
                    OH                 OH II.
(A) + 2NaOH → CH$_2$CHCH$_2$—S—R—S—CH$_2$CHCH$_2$ + 2NaCl
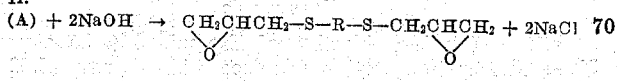

where R is the radical

—(CH$_2$H$_4$OCH$_2$OC$_2$H$_4$SS)$_n$C$_2$H$_4$OCH$_2$OC$_2$H$_4$— and $n$ is 0 or an integer having a value from 1 to 50. In the case of the liquid polymers having an average molecular weight of 300 described in the table above, the average molecular weight of the R radical is about 234.

In carrying out the reaction it is frequently convenient to add the alkali in stages; the first addition being a catalytic quantity sufficient for reaction I, and the second being the stoichiometric quantity to satisfy the requirements of reaction II.

To avoid the formation of epoxide polymers, it is essential to have an excess of epichlorhydrin present over that required by reaction I, and this excess is desirably from four to eight moles of epichlorhydrin per mole of the dithiol, with the preferred ratio being six to one.

The reaction is an exothermic one, and to avoid an excessive rise in temperature it is convenient to carry out the reaction in the presence of a diluent such as an alcohol or an ether. The reaction may be conducted in air or in an inert atmosphere. When the latter is used, lighter color products are obtained.

Isolation of the reaction product is usually accompanied by distilling off the organic solvent used in the reaction, and dissolving the residue in a water immiscible organic solvent, such as methyl isobutyl ketone or toluene. The solution formed is then washed with water to remove all inorganic salts and alkalies. The washed solution is then subjected to distillation to remove the organic solvent. The glycidyl thioether of the dithiol is a light yellow to light tan colored product having a viscosity at 25° C. varying from 100 to 40,000 cs., depending on the molecular weight of the dithiol used, and possesses a not unpleasant ethereal odor.

The diglycidyl thioethers of this invention are capable of a variety of reactions. Thus they may be polymerized to soft or rubbery gels in the presence of alkaline catalysts, such as alkalis or tertiary amines. The amount of such catalyst may vary from about 0.1% to about 20% by weight of the diglycidyl thioether, and suitable alkaline catalysts include sodium hydroxide, potassium hydroxide, triethylamine and benzyldimethyl amine.

Also, the diglycidyl thioethers react with polyfunctional materials having a labile hydrogen atom on the functional group to form gels, resins or rubbers. Such polyfunctional materials include polyols, polythiols, polycarboxylic acids, polyamines, and polyhydric phenols, such as bisphenols or poly(phenylolmethanses). Also, these diglycidyl thioethers may be reacted with diglycidyl ethers of poly(phenylolmethanes), such as the diglycidyl ethers of diphenylolmethane or diphenylolpropane (dimethyldiphenylolmethane), in the presence of hardening agents to form resins which are softer than the unmodified resins formed from the diglycidyl ethers of the poly(phenylolmethanes) themselves. Thus the diglycidyl thioethers act as internal plasticizers in such reactions. If desired, the diglycidyl thioethers may be reacted with mixtures of different polyfunctional materials, such as mixtures of dibasic acids with the diglycidyl ethers of the above-mentioned poly(phenylolmethanes).

The following examples will serve to illustrate the invention:

Example 1

A dithiol having the general formula:

HS(CH$_2$CH$_2$O—CH$_2$O—CH$_2$CH$_2$S—S)$_n$
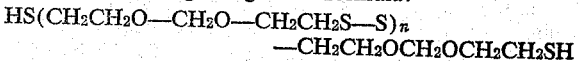
—CH$_2$CH$_2$OCH$_2$OCH$_2$CH$_2$SH and having a molecular weight of about 300 was reacted with epichlorohydrin in the following proportions.

One hundred and fifty parts (1 mole SH) of the dithiol, 277 parts (3 moles) of epichlorohydrin and 70 parts of ethyl alcohol were mixed, and to this mixture were added 92 parts of a 50% sodium hydroxide aqueous solution in the course of two hours. During the addition, of the first 5% of the caustic, the reaction was extremely exothermic, and the color of the reaction mixture changed from red to light yellow. After the color change the remainder of the caustic could be added as rapidly as desired without excessive heat evolution. The reaction product was distilled at reduced pressure (20–50 mm. Hg) to 65° C. The residue in the flask was dissolved in toluene, transferred to a separatory funnel, the toluene solution separated off, and washed several times with water.

The washed toluene solution was then distilled under a reduced pressure of 50–75 mm. Hg to a temperature of 110° C., and a yield of 191 grams of a viscous, light yellow product obtained as a residue. The product had an epoxy equivalent weight of 249 grams/gram mole epoxy and a viscosity of 125 cs. at 26° C., and a chlorine content of 0.17%. It possessed a mild thioether odor.

Example 2

Six hundred grams (2 moles SH) of a dithiol of the structure shown in Example 1 and having a molecular weight of about 600, 555 grams (6 moles) of epichlorohydrin and 140 grams of ethyl alcohol were mixed and heated to 50° C. Then 180 grams of a 50% aqueous solution of sodium hydroxide were slowly added, maintaining a temperature of 60° to 65° C. When the reaction was no longer exothermic (indicated by a color change from red to yellow) the caustic was added at a more rapid rate. After the final addition of caustic, which required about 1½ hours, the reaction was continued for about another fifteen minutes. The reaction mixture was then subjected to distillation at reduced pressure (20–50 mm. Hg) to 65° C. The residue in the flask was dissolved in two liters of toluene, transferred to a separatory funnel, and washed several times with water.

The washed toluene solution was subjected to distillation at reduced pressure (50–75 mm. Hg) to 110° C. and a yield of 642 grams of a viscous, light yellow product was obtained as a residue. It had an epoxy equivalent weight of 430 grams/gram mole epoxy, a chlorine content of 0.62%, and a viscosity at 26° C. of 560 cs.

Example 3

Two thousand grams (1 mole SH) of a dithiol of the structure of Example 1 and having a molecular weight of 4000, 278 grams (3 moles) of epichlorohydrin, and 70 grams of ethyl alcohol were heated to 55° C. and 92 grams of a 50% aqueous sodium hydroxide solution were added slowly until the exothermic reaction had subsided, and then at a more rapid rate, while maintaining a temperature of 60° to 65° C. The reaction was continued for fifteen minutes after the final addition of caustic. The reaction mixture was then distilled under reduced pressure (50–75 mm. Hg) to 65° C., and then cooled to 25° C. Two parts of toluene were added to one part of the product remaining after distillation, and this mixture transferred to a separatory funnel, and washed several times with water.

The washed mixture was then subjected to distillation at reduced pressure (20–50 mm. Hg) to 116° C., obtaining a yield of 2038 grams of viscous, light yellow product, having an epoxy equivalent weight of 2335 grams/gram mole epoxy, a chlorine content of 0.319%, and viscosity at 26° C. of 36,000 cs.

Example 4

In this example the reaction was conducted in an atmosphere of nitrogen.

Two thousand grams (4 moles SH) of a dithiol of the structure shown in Example 1 (molecular weight, 1000, viscosity poises, 10, pH, 5 to 6, sp. g. 1.27) were mixed with 600 grams of ethanol, and 1110 grams (12 moles) of epichlorohydrin, and heated to 60° to 65° C. in a flask provided with an agitator. Four hundred and ten grams of a 50% aqueous solution of sodium hydroxide were added at the following rate.

Forty-one grams of the sodium hydroxide solution were added during the first 60 minutes. During this addition, the reaction was quite exothermic, and the temperature rose to 80° C. before it could be controlled. After completion of the first addition of caustic, the reaction proceeded smoothly at a temperature of 60° to 65° C., and the remaining caustic solution was added as follows:

41 grams during the 30 minutes following the first addition
82 grams during the next 30 minutes
103 grams during the next 30 minutes
143 grams during the next 30 minutes After the last addition of caustic the reaction was continued for an additional 35 minutes at a temperature of 60° to 65° C. The mixture was then distilled under reduced pressure (20–50 mm. Hg) until the temperature of the residue in the flask attained 70° C. This residue was then dissolved in 2000 grams of methyl isobutyl ketone and transferred to a separatory funnel. The flask was washed out with an additional 1000 grams of methyl isobutyl ketone and the washings added to the portion in the separatory funnel. Any salt remaining in the flask was washed out with distilled water, and the washings well mixed with the ketone solution of the residue in the separatory funnel. The water layer was drawn off and discarded and the ketone solution washed with a fresh quantity of distilled water (600 grams). The water layer was separated off and the washing repeated some four times with 600 gram portions of distilled water until the washings were no longer alkaline to litmus.

The ketone solution of the residue was transferred to a flask equipped with a fractionating column and methyl isobutyl ketone removed under reduced pressure (20–50 mm. Hg) to a residue temperature (thermometer bulb in residue) of 130° C. The yield of residue remaining in the flask was 2204 grams of about 99% of the theoretical value for the diglycidyl ether of the starting thiol. The residue had a Gardner color of 7–8, and a viscosity at 25° C. of 2000 centistokes. Its epoxy equivalent weight was 711 grams/gram mole epoxy.

In the above experiments, the epoxy equivalent weight was determined as follows. One gram of the epoxide composition was heated with an excess of pyridine containing pyridine hydrochloride (made by adding 16 cc. of concentrated hydrochloric acid per liter of pyridine) at the boiling point for 20 minutes, and the excess pyridine hydrochloride was back titrated with 0.1 N sodium hydroxide using phenolphthalein as an indicator and considering that one mole of HCl is equivalent to one epoxide group.

The examples to follow describe the reaction of the diglycidyl thioether of Example 4 with polyfunctional materials to form rubbers, resins and gels.

Example 4a

Ten grams of the diglycidyl thioether of Example 4 were mixed with one gram of benzyldimethyl amine as a hardening catalyst and left to stand for one week at room temperature. At the end of this time, a gel was formed.

Example 4b

The diglycidyl thioether of Example 4 (15.6 grams—equivalent to $15.6/711$ or 0.022 mole epoxy) was mixed with 10 grams (0.02 mole SH) of a dithiol of the structure shown in Example 1 (molecular weight 1000) and 0.1 gram of benzyldimethyl amine. The mixture was very slow in hardening at room temperature, but the rate of hardening is increased at higher catalyst concentrations.

Example 4c

The diglycidyl thioether of Example 4 (15.6 grams = 0.022 mole epoxy) was mixed with 1 gram (0.024 mole —NH—) of the reaction product of 100 parts diethylene triamine and 94.8 parts of the diglycidyl ether of 4,4'-diphenyloldimethylmethane. When heated at 160° C., the mixture formed a soft, crumbly and sticky gel within 3 minutes, 42 seconds. On standing at room temperature, the mixture was gelled at the end of 48 hours.

Example 4d

The diglycidyl thioether of Example 4 (85.3 grams =0.12 mole epoxy) was mixed with 17 grams (0.10 mole phenolic-OH) of a poly(phenylolmethane) in ethanol solution and the ethanol removed under vacuum. When the residue cooled to 55° C., 1.02 cc. of benzyldimethyl amine were added and the mixture heated to 60°–65° C. to disperse the amine.

When this mixture was heated more strongly at 120° C. for three hours, a soft, rubbery gel was formed. On standing at room temperature, the original mixture became viscous but did not gel until heated an additional 24 hours at 120° C.

Example 4e

The diglycidyl thioether of Example 4 (15.64 grams =0.022 mole epoxy) was warmed with 1.34 grams (0.02 mole —COOH) of diglycolic acid to dissolve the acid. On heating the mixture for six hours at 120° C., a soft gel was obtained.

Example 4f

The diglycidyl thioether of Example 4 (15.64 grams =0.022 mole epoxy) was mixed with 1.96 grams (0.02 mole —COOH) of maleic anhydride. On warming, a gel was formed which was soft, rubbery and sticky when hot, and soft and crumbly when cold.

Example 4g

The diglycidyl thioether of Example 4 (10 grams =0.0146 mole epoxy) was mixed with 0.3 grams (0.146 mole —NH—) of diethylene triamine. In 12 hours the mixture became a soft gel which hardened after five days.

Example 4h

A hardener was prepared by mixing 71.1 grams (0.1 mole epoxy) of the diglycidyl thioether with 20.6 grams (0.2 mole) of diethylene triamine. This hardener (11.2 grams—equivalent to 0.1 mole —NH—) was incorporated with 71.1 grams (0.1 mole epoxy) of the same diglycidyl thioether and allowed to stand. At the end of 72 hours the composition was a soft clear gel which hardened at the end of five days.

Example 4i

This example shows the utility of the diglycidyl thioethers as plasticizers for other epoxide resins.

Thus, 173.7 grams of the diglycidyl ether of 4,4'-diphenyloldimethylmethane were mixed with 71.1 grams of the diglycidyl thioether of Example 4. Thirty grams of this mixture was incorporated with 10 grams of a hardener which comprised the adduct of four moles of diethylene triamine and 1 mole of the diglycidyl ether of 4,4'-diphenyloldimethylmethane. On standing, the mixture became a soft gel in one hour and forty-five minutes. A larger quantity amounting to 60 grams of a similar mixture remained fluid for about twenty-five minutes and then became a soft gel.

These gels were softer than the products obtained from the diglycidyl ether of the bisphenol in the absence of the diglycidyl thioether, showing the plasticizing action of the latter.

What is claimed is:

1. The diglycidyl thioethers of the formula:

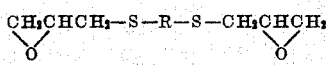

where R is the radical

—(C₂H₄OCH₂OC₂H₄SS)$_n$C₂H₄OCH₂OC₂H₄— and $n$ is an integer having a value from 0 to 50.

2. The diglycidyl thioethers of the formula:

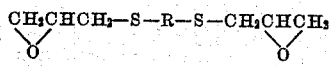

where R is the radical

—(C₂H₄OCH₂OC₂H₄SS)$_n$C₂H₄OCH₂OC₂H₄— and $n$ has a value such that the average molecular weight of R is from about 234 to about 4000.

3. Process of making diglycidyl thioethers of the formula:

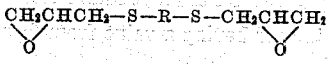

where R is the radical

—(C₂H₄OCH₂OC₂H₄SS)$_n$C₂H₄OCH₂OC₂H₄— and $n$ has a value such that the average molecular weight of R is from about 234 to about 4000, which comprises reacting a dithiol of the formula HS—R—SH with an excess of epichlorhydrin in the presence of an alkali; the alkali being added in increments during the reaction.

4. Process which comprises reacting a diglycidyl thioether of the formula:

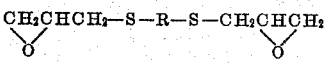

where R is the radical

—(C₂H₄OCH₂OC₂H₄SS)$_n$C₂H₄OCH₂OC₂H₄— and $n$ has a value such that the average molecular weight of R is from about 234 to about 4000, with a polyfunctional material having a total of at least two labile hydrogen atoms attached to the functional groups.

5. Process as claimed in claim 4 in which the polyfunctional material is a polyamine.

6. Process as claimed in claim 4 in which the polyfunctional material is a dicarboxylic acid.

7. Process as claimed in claim 4 in which the polyfunctional material is the adduct of a polyamine and the diglycidyl ether of a bisphenol.

8. Process as claimed in claim 4 in which the polyfunctional material is the adduct of diethylene triamine and the diglycidyl ether of 4,4'-dihydroxydiphenyldimethyl methane.

9. Process as claimed in claim 4 in which the polyfunctional material is a poly(phenylolmethane).

10. Process as claimed in claim 4 in which the polyfunctional material is a dimercaptan.

11. Process of making polymeric materials which comprise mixing an alkaline catalyst with a diglycidyl thioether of the formula:

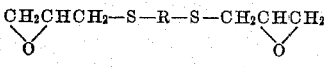

where R is the radical

—(C₂H₄OCH₂OC₂H₄SS)$_n$C₂H₄OCH₂OC₂H₄— and $n$ is an integer having a value from 0 to 50.

12. Process as claimed in claim 11 in which the alkaline catalyst is benzyldimethyl amine.

13. Process of making polymeric materials which comprise reacting in the presence of an alkaline catalyst a diglycidyl ether of a diphenylolmethane with a diglycidyl thioether of the formula:

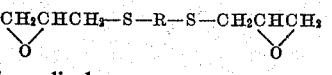

where R is the radical

—(C₂H₄OCH₂OC₂H₄SS)$_n$C₂H₄OCH₂OC₂H₄— and $n$ is an integer having a value from 0 to 50.

14. Process as claimed in claim 13 in which the diglycidyl ether of the diphenylolmethane is the diglycidyl ether of 4,4'-diphenyloldimethylmethane.

15. Process of making polymeric materials which comprises reacting a polyfunctional material having a total of at least two labile hydrogen atoms attached to the functional groups with a mixture of two classes of diglycidyl ethers, one class of said ethers being the diglycidyl ethers of a diphenylolmethane and the other class being the diglycidyl thioethers of the formula:

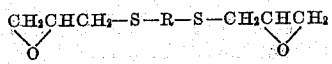

where R is the radical

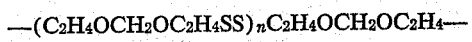

and $n$ is an integer having a value from 0 to 50.

16. Process as claimed in claim 15 in which the polyfunctional material is a dicarboxylic acid.

References Cited in the file of this patent

UNITED STATES PATENTS

| | | |
|---|---|---|
| 2,466,963 | Patrick | Apr. 12, 1949 |
| 2,538,072 | Zech | Jan. 16, 1951 |

FOREIGN PATENTS

| | | |
|---|---|---|
| 678,576 | Great Britain | Sept. 13, 1952 |

OTHER REFERENCES

Columbia Encyclopedia, Columbia University Press, page 2196.